UNITED STATES PATENT OFFICE.

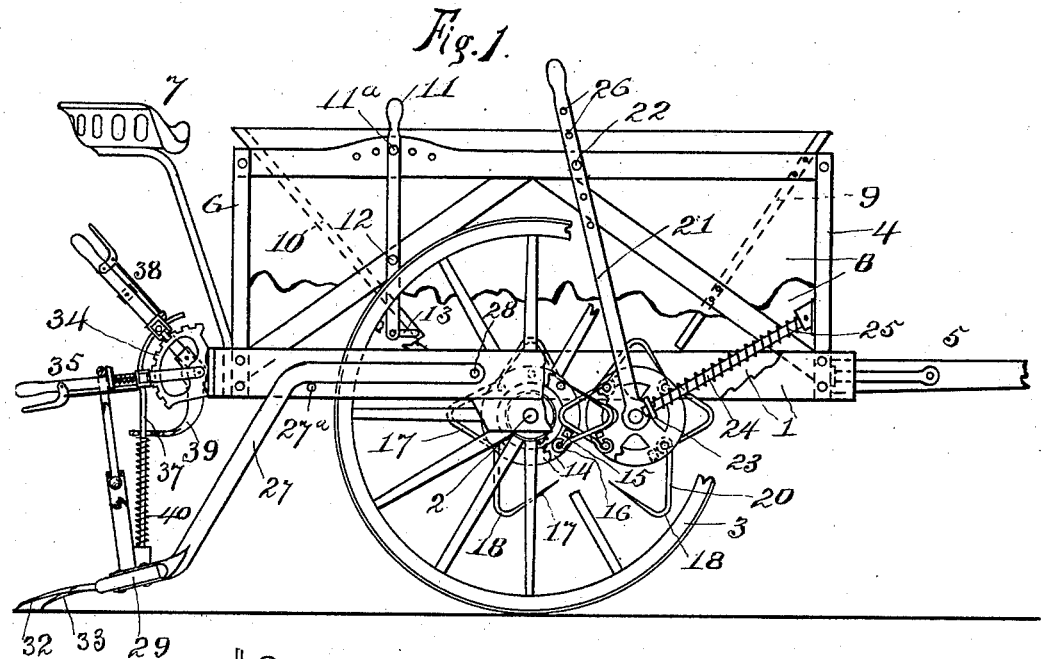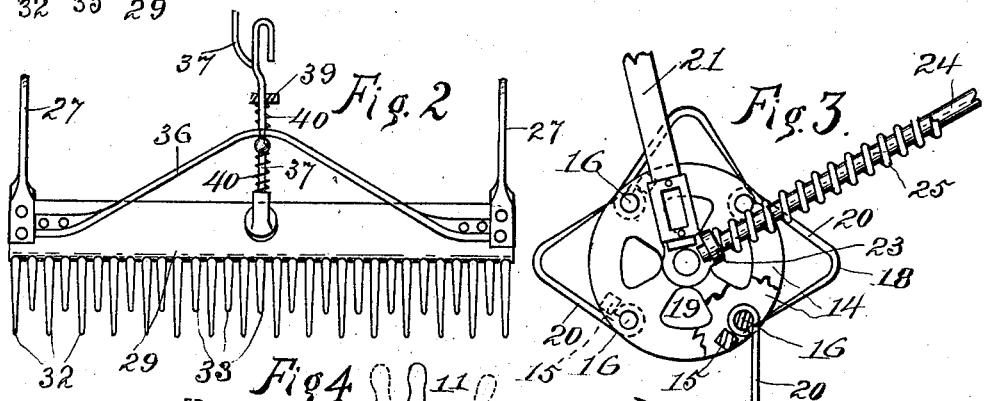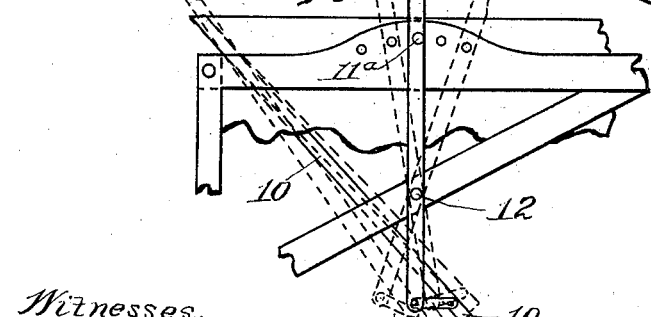

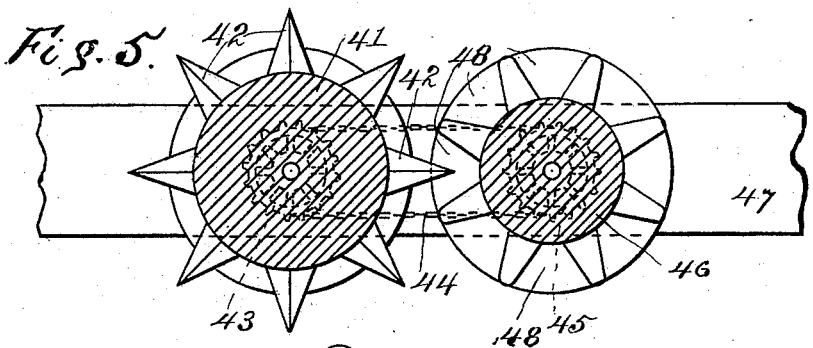
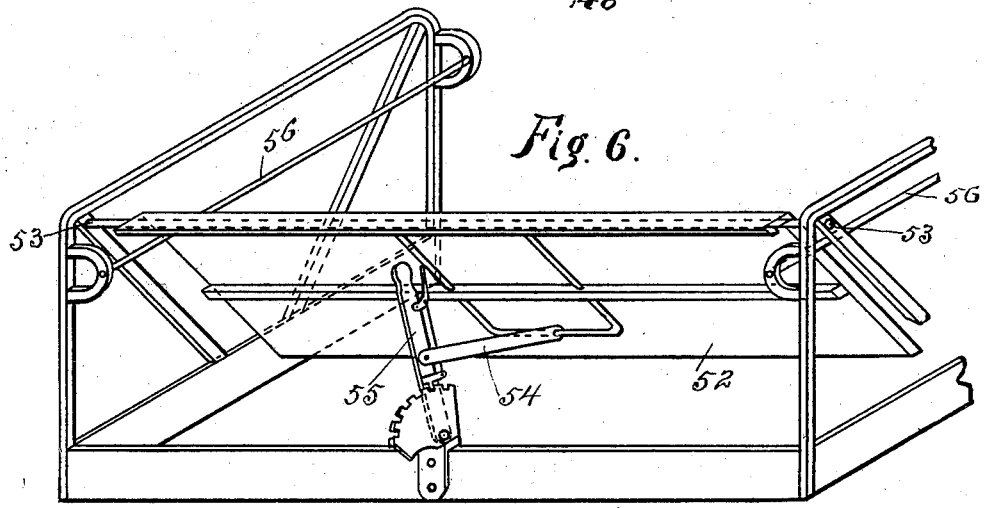
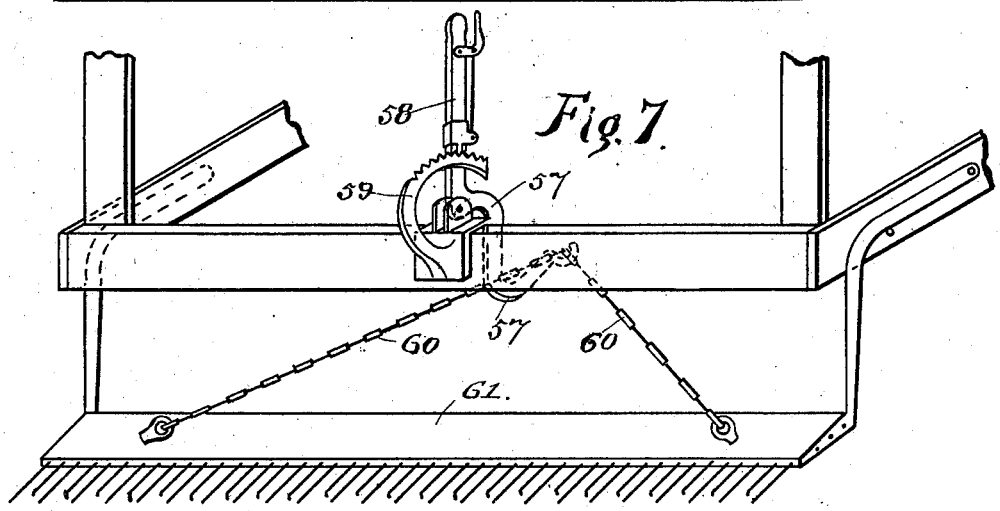

JOHANNES WEE, OF OAK PARK, MINNESOTA.

MANURE-DISTRIBUTING MACHINE.

SPECIFICATION forming part of Letters Patent No. 670,046, dated March 19, 1901.

Application filed August 30, 1900. Serial No. 28,548. (No model.)

*To all whom it may concern:*

Be it known that I, JOHANNES WEE, a citizen of the United States, residing in the township of Oak Park, in the county of Marshall and State of Minnesota, have invented certain new and useful Improvements in Manure-Distributing Machines, of which the following is a specification.

This invention relates to fertilizer-distributers, and particularly to a machine for mixing, grinding or crushing, feeding, and spreading manure; and one object of the invention is to provide a machine possessing certain improvements for feeding and distributing the manure and for spreading the same.

A further object of the invention is to provide a pair of feed-rollers having fingers of novel and peculiar construction and means for flexibly hanging one roller with respect to the other, so that during the revolution of one roller the fingers thereof will revolve the other roller.

A still further object of the invention is to provide a machine having a movable hopper end, means for adjusting said end to vary the discharge from the hopper, novel and peculiar device for hanging a spreader from the machine, and special means for adjusting the spreader under spring tension.

In the accompanying drawings, forming part of this application, Figure 1 is a side elevation of the machine, partly broken away. Fig. 2 is a rear view of the spreader. Fig. 3 is a detail view of the spring-tension roller-hanger. Fig. 4 is a detail view of the hopper-end-adjusting levers. Fig. 5 is a cross-section of a modified form of rollers. Fig. 6 is a perspective view of frame modification. Fig. 7 is a perspective view of modified form of spreader.

The same numerals of reference denote the same parts throughout the several views of the drawings.

The machine-frame is composed of side pieces 1, having the axle 2 of the wheels 3' journaled therein, front pieces 4, having a draft-tongue 5, and rear pieces 6, having a driver's seat 7 secured thereto. The hopper or manure-receptacle consists of sides 8, fixed to the frame sides 1, an end 9, secured to the frame-pieces 4, and an end 10, which fits loosely between the frame sides against the frame-pieces 6 and is operated by a hand-lever 11, having a controlling-pin 11ª. This lever has a forked end pivoted at 12 and is connected to the hopper end 10 by a link 13 to vary the discharge of manure from the hopper. Of course these levers are duplicated, one set being on each side of the machine, so that by moving the levers back and forth they will slide the loose hopper end 10 to and from the fixed hopper end, thus varying the space between the bottoms of the two ends.

A skeleton cutting or crushing and feeding roller, comprising end disks 14, joined together by ribs 15, is fixed upon the axle 2 and is provided with rods 16, secured at each end to the disks 14. Upon these rods is pivoted a series of fingers 17, having bends or knees 18, the fingers of one rod alternating those of the other. A supplemental roller 19, of the same structure as the other roller and having pivoted fingers 20, of like shape as the fingers 17, is journaled in a hanger 21, pivoted at 22, and has a lug 23, through which works one end of a rod 24, the other end of the rod being secured to the frame portion 4. A spiral spring 25 surrounds the rod 24 between frame portion 4 and the said lug 23. The hanger 21 has a series of apertures 26 to permit its being raised and lowered that a greater or less space may be made between the two rollers than the spring 25 allows. This roller is revolved during the revolution of the axle-roller by the knees of the fingers striking the ribs of the supplemental roller. The described means of hanging the supplemental roller not only permits it to be adjusted relative to the axle-roller, but affords a spring tension between the rollers, which is vastly important, owing to the varying condition of manure. The free end of the fingers gradually swing away from their rollers (during the revolution of the latter) as the rods to which they are pivoted approach the ground and discharge any manure lodged thereon. These finger ends have their bearing on the roller-ribs, while the knees of the same fingers engage the ribs of the opposite roller. Owing to the shape of the fingers and their position when meshing and engaging the ribs to revolve the supplemental roller there is sufficient elasticity in the fingers and to obviate any jar or fracture of the parts, and unnecessary friction is entirely avoided. Thus it will be observed that the supplemental roller is rendered doubly resilient and elastic relative to the axle-roller by the fingers and the spiral springs 25.

A manure-spreader is connected to the rear of the machine by angle-arms 27, controlled by a stop-pin 27ª and pivoted at one end to the side frames at 28, while their other ends are secured to the ends of the spreader board or plate 29. This board or plate is provided with a series of wire fingers 32, which alternate with shorter fingers 33, the ends of which are bent downwardly, thus forming a rake. The means for adjusting and controlling the spreader consists of a toothed segment 34, secured to the rear frame portion 6, and a hand-lever 35, carrying a pawl and to which is connected the end of a forked standard 36, the forks thereof being attached to the spreader-board 29. The spreader has a spring tension formed by a rod 37, having one end secured to the spreader-board and the other end attached to a ratchet-lever 38. The rod 37 is worked (by moving the lever 38) through a bracket 39, and a spiral spring 40 surrounds the rod 37 between said bracket and the spreader-board. It is obvious, therefore, that the spreader has a spring tension at all times which may be altered or varied as desired without stopping the machine and that the spreader may be raised from the ground at will.

Referring to the modified form of rollers shown in Fig. 5, the axle-roller 41 has a series of pointed angular fingers 42, and the axle is provided with a sprocket-wheel 43, having a drive-chain 44, connected with a like sprocket-wheel 45 on the shaft of a supplemental roller 46. This roller 46 is journaled in the side frames 47 of the machine and has a series of cavities 48, in which work the points of the fingers 42 during the revolution of the rollers, said fingers also working through notches in the bottom edge of the hopper ends.

A modified form of frame is shown in Fig. 6, composed of metal and having hopper-walls, through which the manure is fed onto rollers. One of the said walls 52 is pivoted to the frame at 53 and is connected by a lever 54 to a ratchet-lever 55 for working the same to vary the discharge-opening. The frame is provided with suitable cross-braces 56.

In Fig. 7 is shown a modified means for working the spreader, which consists of a crank-arm 57, of a ratchet-lever 58, a toothed segment 59, to which said arm is journaled, and a chain 60, depending from the end of the said arm and secured to the inner edge of the spreader-board 61.

Having thus described my invention, what I claim as new, and desire to secure by Letters Patent, is—

1. In a manure-distributer, the combination, with a roller upon the axle of the machine, and the fingers pivoted to the roller, of the supplemental roller having like pivoted fingers meshing with the fingers of the axle-roller, and means for flexibly hanging the supplemental roller so that it will be revolved by the fingers of the axle-roller.

2. In a manure-distributing machine, the combination, with a roller secured to the axle of the machine and having a series of bent fingers pivoted thereto, of a like supplemental roller adjustably journaled relative to the axle-roller so that the bends of the said fingers will engage and revolve the supplemental roller.

3. The combination with the axle-roller, of the supplemental roller, and means for hanging it so as to be revolved by the axle-roller, comprising a pivoted hanger having a lug, a rod having one end fixed and the other end working through the said lug, and a spiral spring surrounding the rod between the lug and its fixed end.

4. In a manure-distributing machine, the combination, of the hopper having a loose end, and means for adjusting said end to vary the discharge from the hopper, comprising a pivoted lever, and a link connecting the lever with the said movable hopper end.

5. In a manure-distributing machine, the combination of the roller secured to the axle of the machine, the spring-controlled adjustable roller suspended from the frame of the machine and operated by the axle-roller, fingers pivoted to each roller and adapted to swing away from the rollers to deposit the manure, a hopper above the rollers having a movable end, and the pivoted lever-and-link connection for moving the said end to vary the discharge from the hopper.

In witness whereof I hereunto set my hand in the presence of two witnesses.

JOHANNES WEE.

Witnesses:
 ANDREW GRINDELAND,
 MILES B. NEWBURG.